(12) United States Patent
Kim et al.

(10) Patent No.: US 9,340,172 B2
(45) Date of Patent: May 17, 2016

(54) TUBULAR BACK BEAM ASSEMBLY FOR VEHICLE AND METHOD OF MANUFACTURING THE SAME

(71) Applicant: Hyundai Motor Company, Seoul (KR)

(72) Inventors: Hyun Gyung Kim, Hwaseong-si (KR); Seok Jae Park, Anyang-si (KR); Dong Hak Kim, Ulsan (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/326,225

(22) Filed: Jul. 8, 2014

(65) Prior Publication Data

US 2015/0115572 A1    Apr. 30, 2015

(30) Foreign Application Priority Data

Oct. 29, 2013 (KR) ................ 10-2013-0129621

(51) Int. Cl.
*B60R 19/12* (2006.01)
*B60R 19/34* (2006.01)
*B21D 53/88* (2006.01)
*B60D 1/56* (2006.01)
*B60R 19/26* (2006.01)
*B60D 1/24* (2006.01)
*B60D 1/48* (2006.01)

(52) U.S. Cl.
CPC ............ *B60R 19/12* (2013.01); *B21D 53/88* (2013.01); *B60D 1/243* (2013.01); *B60D 1/485* (2013.01); *B60D 1/488* (2013.01); *B60D 1/56* (2013.01); *B60D 1/565* (2013.01); *B60R 19/26* (2013.01); *B60R 19/34* (2013.01); *Y10T 29/49622* (2015.01)

(58) Field of Classification Search
CPC .......... B60R 19/04; B60R 19/12; B60R 19/34
USPC .......... 293/121, 122, 102, 133, 146, 147, 148
See application file for complete search history.

(56) References Cited

U.S. PATENT DOCUMENTS

| 7,665,777 | B2 | | 2/2010 | Mellis et al. | |
|---|---|---|---|---|---|
| 8,128,150 | B2 | * | 3/2012 | Kamiya | 296/102 |
| 8,408,636 | B1 | * | 4/2013 | Slaats et al. | 296/187.08 |
| 8,678,423 | B1 | * | 3/2014 | Hwang | 280/495 |
| 2007/0152456 | A1 | * | 7/2007 | Caliskan et al. | 293/102 |
| 2008/0217934 | A1 | * | 9/2008 | Hori et al. | 293/102 |
| 2011/0109122 | A1 | * | 5/2011 | Clausen et al. | 296/187.03 |
| 2012/0153645 | A1 | * | 6/2012 | Roll et al. | 293/120 |
| 2012/0292930 | A1 | * | 11/2012 | Hermanson et al. | 293/102 |

FOREIGN PATENT DOCUMENTS

| JP | 2003-313434 A | 11/2003 |
|---|---|---|
| JP | 2005153750 A | 6/2005 |
| JP | 2008504162 A | 2/2008 |
| KR | 10-2005-0015333 A | 2/2005 |
| WO | WO 99/07492 A1 | 2/1999 |

* cited by examiner

*Primary Examiner* — Jason S Morrow
(74) *Attorney, Agent, or Firm* — Morgan, Lewis & Bockius LLP

(57) ABSTRACT

A tubular back beam assembly may include a plurality of main members, each of which is formed by cold rolling and hot stamping and the plurality of main members may be coupled to form a vertically stacked structure with flat portions coupled in a surface contact fashion or, the tubular back beam assembly may include a main member and at least one support member that are directly coupled to form a vertically stacked structure.

4 Claims, 8 Drawing Sheets

TUBULAR BACK BEAM ASSEMBLY FOR VEHICLE AND METHOD OF MANUFACTURING THE SAME

CROSS-REFERENCE(S) TO RELATED APPLICATION

The present application claims priority of Korean Patent Application Number 10-2013-0129621 filed on Oct. 29, 2013, the entire contents of which application are incorporated herein for all purposes by this reference.

BACKGROUND OF INVENTION

1. Field of Invention

The present invention relates, in general, to a tubular back beam assembly for a vehicle and a method of manufacturing the same, and, more particularly, to a tubular back beam assembly for a vehicle, in which a plurality of tubular back beams are coupled in a vertically stacked structure in a surface contact fashion, and a method of manufacturing the same.

2. Description of Related Art

To protect a vehicle body and a passenger in the event of a collision, a back beam assembly is mounted in the front and rear of the vehicle.

FIG. 1 illustrates an example of a tubular back beam assembly. A conventional tubular back beam assembly 1 has a structure in which an upper beam 1a and a lower beam 1b which have a circular cross section are installed at an interval in a vertical direction, intermediate portions of the upper beam 1a and the lower beam 1b are coupled using a coupling bracket 1c, and stays 3 or crash boxes used to couple to side members 2 are coupled to both ends of the upper beam 1a and the lower beam 1b.

The tubular back beam assembly 1 configured as described above has the effect reducing weight and cost compared to a general integrated back beam. In particular, each of the upper beam 1a and the lower beam 1b can dissipate and absorb collision energy. Thereby, there is an advantage in that collision performance can be more effectively satisfied.

However, the conventional tubular back beam assembly 1 as described above has a structure in which the upper beam 1a and the lower beam 1b are separated from each other, and the upper beam 1a and the lower beam 1b which are separated from each other are coupled by the coupling bracket 1c. Thus, in the conventional tubular back beam assembly 1, coupling strength of the upper beam 1a and the lower beam 1b is insufficient. There is a high probability of the upper beam 1a and the lower beam 1b being vertically widened by collision energy in the event of the collision of the vehicle. In this case, the conventional tubular back beam assembly 1 cannot effectively cope with the collision. Thus, the vehicle body suffers heavy damage, and the passenger may be greatly injured.

In addition, the upper beam 1a and the lower beam 1b of the conventional tubular back beam assembly 1 are manufactured by pressing or extruding a general steel pipe. The upper beam 1a and the lower beam 1b manufactured as described above have a disadvantage in that they are heavy due to a thick construction and, in particular, it is difficult to satisfy sufficient collision performance due to weak strength.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the related art and/or other problems, and the present invention is intended to provide a tubular back beam assembly for a vehicle in which a plurality of tubular back beams are coupled to form a vertically stacked structure in a surface contact fashion, and thereby, coupling strength and bending rigidity can be remarkably increased through the vertical stacked structure and the surface contact fashion, and sufficient collision strength can be secured to further improve the capability of protecting a vehicle body and a passenger.

In addition, the present invention is intended to use a steel pipe whose thickness is reduced to reduce weight and increase rigidity by cold rolling and hot stamping as a material for a tubular back beam assembly.

Various aspects of the present invention provide for a tubular back beam assembly for a vehicle, which includes a plurality of main back beams, each of which is formed in a tubular shape and includes at least one flat portion, wherein the plurality of the main back beams are coupled to form a vertically stacked structure with the flat portions of adjacent main back beams coupled in a surface contact fashion.

Here, the tubular back beam assembly may further include: a pair of crash boxes whose front ends are coupled to rear surfaces of the main back beams at both ends of the main back beams and whose rear ends are coupled to members of a vehicle body, wherein vertical faces of the front ends of the crash boxes are coupled to each of the plurality of the main back beams.

Further, the tubular back beam assembly may include a towing hook, one end of which is detachably coupled to at least one of the main back beams to which the crash boxes are coupled. One or each of the plurality of main back beams may be formed to have substantially a quadrangular cross section to secure rigidity. The flat portions of the adjacent main back beams are coupled to each other by welding.

According to another aspect of the present invention, there is provided a tubular back beam assembly for a vehicle, which includes: a support back beam which is formed to have a C-shaped cross section with an opening extended in a longitudinal direction, and a main back beam which is formed in a tubular shape having substantially a quadrangular cross section and one portion of which is inserted into the opening of the support back beam to close the opening of the support back beam and form a vertically stacked structure along with the support back beam.

Here, the main back beam and the support back beam may be coupled so that only one of an upper portion or a lower portion of the main back beam is inserted into the opening of the support back beam.

Further, the tubular back beam assembly may include a pair of the support back beams, one disposed on the main back beam and one disposed under the main back beam, and the main back beam and the support back beams are coupled so that the upper and lower portions of the main back beam are inserted into the openings of the support back beams.

According to yet another aspect of the present invention, there is provided a method of manufacturing a tubular back beam assembly for a vehicle, which includes: cold rolling and hot stamping a tubular carbonous material to form at least two main back beams, each including at least one flat portion extended in a longitudinal direction, and coupling the at least two main back beams to form a vertically stacked structure with the flat portions of adjacent main back beams coupled in a surface contact fashion.

Here, one or each of the at least two main back beams may be formed to have substantially a quadrangular cross section to secure rigidity. Further, the flat portions of the adjacent tubular back beams may be coupled in the surface contact fashion by arc welding.

According to still another aspect of the present invention, there is provided a method of manufacturing a tubular back beam assembly for a vehicle, which includes: cold rolling and hot stamping a carbonous material to form at least one support back beam having a C-shaped cross section with an opening extended in a longitudinal direction, cold rolling and hot stamping a tubular carbonous material to form at least one main back beam having substantially a quadrangular cross section, and coupling the at least one support back beam and the at least one main back beam to form a vertically stacked structure.

Here, the coupling of the support back beam and the main back beam may include inserting one portion of the main back beam into the opening of the support back beam, and coupling both ends of the support back beam and an overlapping portion of the main back beam by arc welding.

Further, the at least one support back beam and the at least one main back beam may be coupled in a stacked way. In addition, the at least one support back beam may include two support back beams which are disposed on and under the main back beam and coupled with the main back beam in a stacked way.

According to the present invention, main members, or the main member and at least one support member which are formed by cold rolling and hot stamping are directly coupled in a vertically stacked way, or coupled in a vertically stacked way with flat portions thereof coupled in a surface contact fashion. Thereby, there is an effect in which rigidity of the manufactured tubular back beam assembly can be remarkably increased, and sufficient collision strength can be secured. The capability of protecting a vehicle body and a passenger can be further increased, and the tubular back beam assembly can be reduced in weight.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
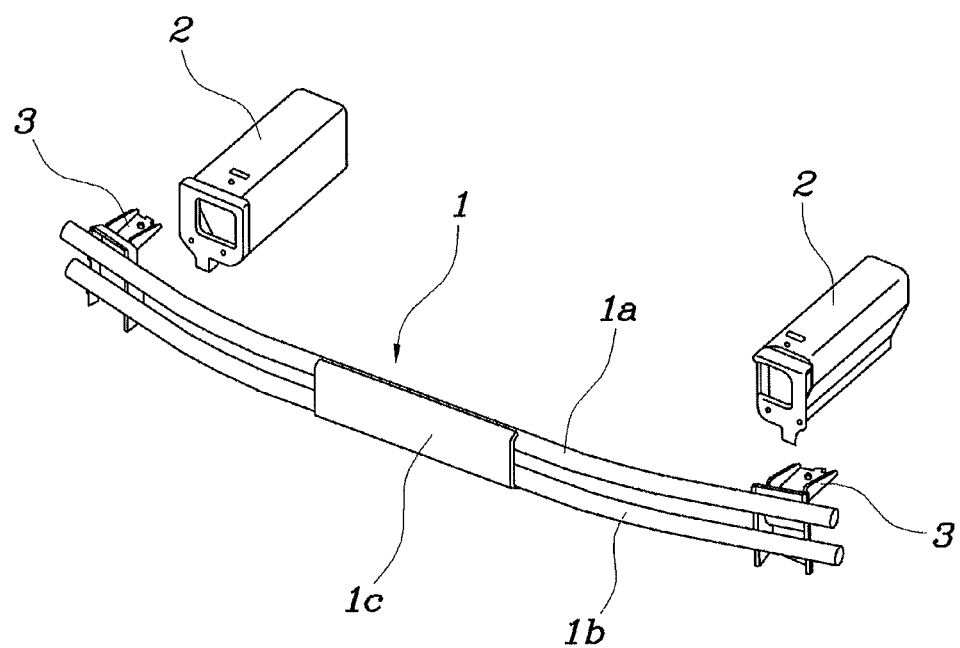
FIG. 1 is a view for describing a conventional tubular back beam assembly for a vehicle.
Figure 2:
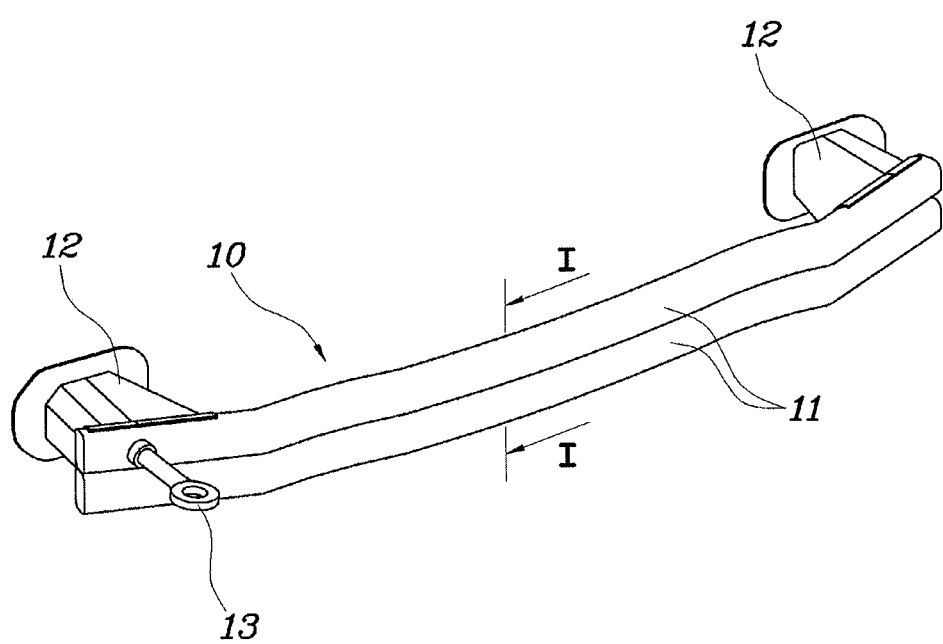
FIG. 2 is a perspective view of an exemplary tubular back beam assembly for a vehicle according to the present invention.
Figure 3:
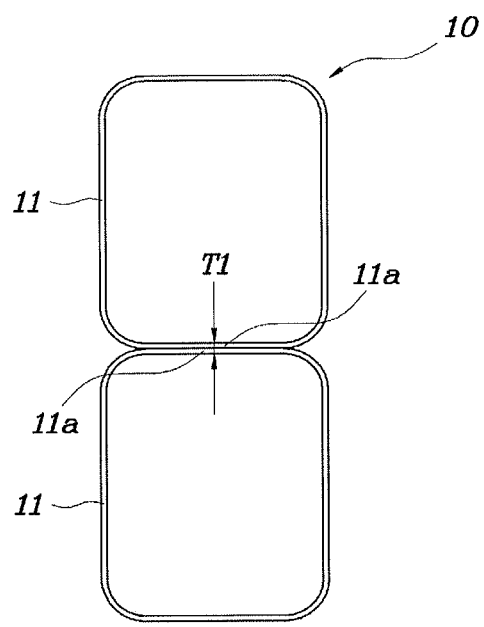
FIG. 3 is a cross-sectional view taken along line I-I of the tubular back beam assembly of FIG. 2 according to the present invention.
Figure 4:
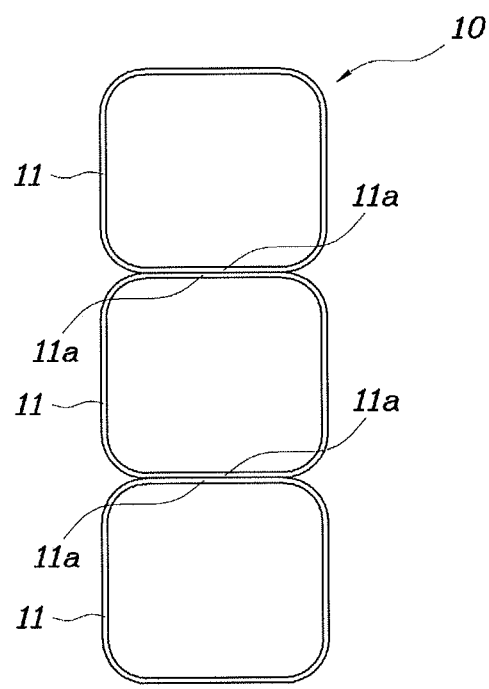
FIG. 4 is a cross-sectional view showing variations from that of FIG. 3.

As shown in FIGS. 2 to 4, a tubular back beam assembly 10 for a vehicle according to various embodiments of the present invention includes a plurality of main back beams 11, each of which is formed in a tubular shape and includes at least one flat portion 11a. The main back beams 11 are coupled in a vertically stacked structure with the flat portions 11a coupled in a surface contact fashion.

In other words, the tubular back beam assembly 10 according to the present invention has a structure in which the plurality of main back beams 11 which are formed to have a quadrangular cross section or substantially a quadrangular cross section are vertically stacked with the flat portions 11a coupled in the surface contact fashion, and the flat portions 11a are integrally coupled to each other such as by arc welding.

Here, the main back beams 11 are formed in the quadrangular cross section so as to be able to secure sufficient coupling strength. With this structure, there is an advantage in that the capability of protecting a vehicle body and a passenger can be further improved.

For example, the main back beams 11 may be formed of a tubular beam having a true circle cross-sectional structure. However, since the true circle cross-sectional structure has a disadvantage in that it is vulnerable to deformation compared to a quadrangle cross-sectional structure. For this reason, the main back beams 11 of the present invention employ the quadrangle cross-sectional structure rather than the true circle cross-sectional structure as a basic cross-sectional structure so as to be able to secure excellent rigidity.

When the flat portions 11a of the main back beams 11 formed to have the quadrangular cross section are coupled in a surface contact fashion, an intermediate widthwise cross-sectional thickness T1 is increased. Thereby, bending rigidity of the tubular back beam assembly 10 can be remarkably increased, and thus collision performance can be improved.

In addition, as in various embodiments of the present invention, when the plurality of main back beams 11 are coupled in the vertically stacked structure in the surface contact fashion, the conventional disadvantage that the main back beams 11 are vertically widened in the event of the collision of the vehicle can be removed. Thus, the capability of protecting the vehicle body and the passenger can be further improved.

The tubular back beam assembly 10 for a vehicle according to various embodiments of the present invention may have a structure in which the two main back beams 11 are coupled in a vertically stacked structure in the surface contact fashion as shown in FIG. 3 or the three main back beams 11 are coupled in the vertically stacked structure in a surface contact fashion as shown in FIG. 4 if necessary.

The structure of FIG. 4 may be relatively heavier compared to the structure of FIG. 3, but its capability of protecting the vehicle body and the passenger can be further improved due to relatively improved coupling strength. Thus, the structure of FIG. 4 is suitable for vehicles that mainly place an emphasis on safety.

On the other hand, the tubular back beam assembly 10 according to the present invention further includes a pair of crash boxes 12 whose front ends are coupled to rear surfaces of both ends of the main back beams 11 and whose rear ends are coupled to members of the vehicle body, and in which vertical faces of the front ends are entirely coupled to the plurality of main back beams 11 which are coupled in the vertically stacked structure.

As described above, when the crash boxes 12 are coupled to all the main back beams 11 which are coupled in the vertically stacked structure, coupling strength of the crash boxes 12 can be remarkably improved and thus shock absorbing performance can be still further improved.

In addition, the tubular back beam assembly 10 for a vehicle according to various embodiments of the present invention further includes a towing hook 13, one end of which is detachably coupled to at least one of the main back beams 11 to which the crash boxes 12 are coupled, and thus the towing hook 13 coupled as described above can have a more stable coupling force.

Figure 5:
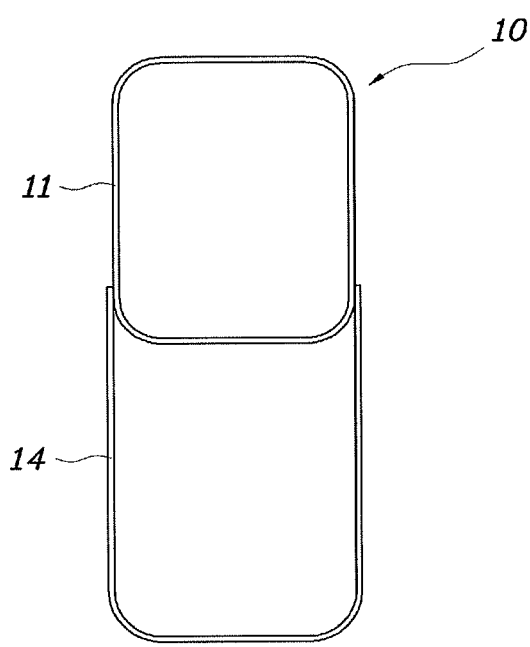
FIG. 5 and FIG. 6 are cross-sectional views of another exemplary tubular back beam assembly according to the present invention.
Figure 6:
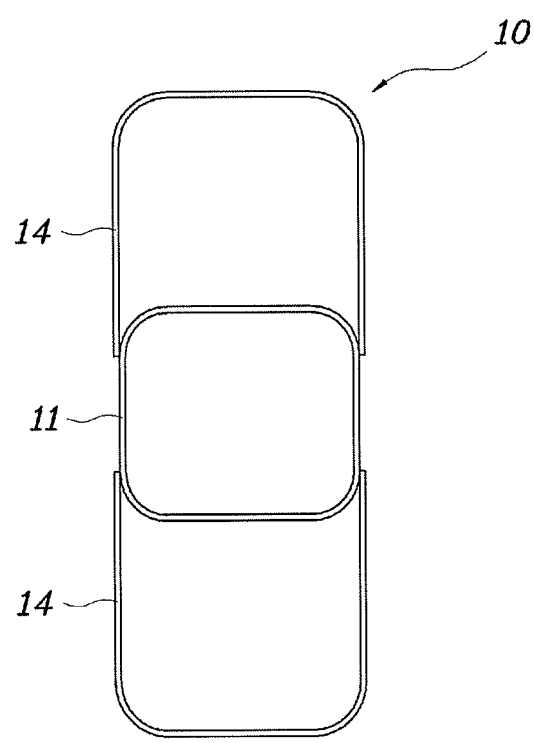

As shown in FIGS. 5 and 6, a tubular back beam assembly 10 for a vehicle according to various other embodiments of the present invention includes at least one support back beam 14 which is formed to have a C-shaped cross section in which one side thereof is opened in a longitudinal direction, and a main back beam 11 which is formed in a tubular shape of a quadrangular cross section and one portion of which is inserted into an opening of the support back beam 14 so as to close the opening of the support back beam 14 and form a vertically stacked structure along with the support back beam 14.

In other words, the tubular back beam assembly 10 has a structure in which the main back beam 11 formed to have the quadrangular cross section and the support back beam 14 formed to have the C-shaped cross section in which one side thereof is opened are vertically stacked and integrally coupled to each other by arc welding.

In comparison with the structures of FIGS. 3 and 4, the structures of FIGS. 5 and 6 may be relatively weaker in coupling strengths but their weights can be relatively reduced. Thus, the structures of FIGS. 5 and 6 are mainly suitable for popular vehicles or light-weight vehicles.

On the other hand, the tubular back beam assembly 10 for a vehicle according to the present invention may have a structure in which one main back beam 11 and one support back beam 14 are coupled so that only one of upper and lower portions of the main back beam 11 is inserted into the opening of the support back beam 14 as shown in FIG. 5, or a structure in which one main back beam 11 and two support back beams 14 are coupled so that the support back beams 14 are disposed on and under the main back beam 11 respectively, as shown in FIG. 6.

In comparison with the structure of FIG. 5, the structure of FIG. 6 may be heavier, but its capability of protecting the vehicle and the passenger is better.

Hereinafter, a method of manufacturing the tubular back beam assembly according to the present invention will be described.

Figure 7:
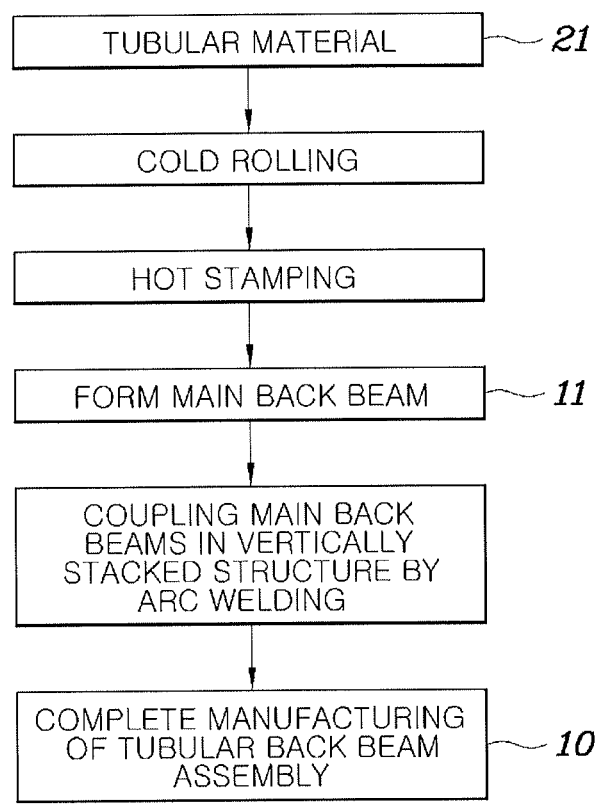
FIG. 7 and FIG. 8 are views for describing exemplary methods of manufacturing a tubular back beam assembly according to the present invention.

In a manufacturing method according to various embodiments of the present invention, a plurality of main back beams 11 are coupled to each other in a stacked way such as those shown in FIGS. 3, 4, and 7. The manufacturing method includes cold rolling and hot stamping a tubular carbonous material 21 to form a main back beam 11 in which at least one flat portion 11a is provided in a longitudinal direction, and coupling the main back beams 11 in a vertically stacked structure so that the flat portions 11a are coupled in a surface contact fashion. Thereby, the tubular back beam assembly 10 is manufactured.

Here, when the tubular carbonous material 21 is cold-rolled, a thickness of the material 21 is reduced by about 50%. Thus, the tubular back beam assembly can be reduced in weight.

In addition, when the material whose thickness is reduced by the cold rolling is subsequently subjected to the hot stamping, tensile strength of the formed main back beam 11 is increased by about 30%.

In other words, the main back beam 11 formed by the cold rolling and the hot stamping is thinner and stronger than a back beam formed by general extrusion or roll forming. Thus, the capability of protecting the vehicle body and the passenger can be further improved.

Here, the main back beam 11 is preferably formed to have a quadrangular cross section or substantially a quadrangular cross section in order to secure rigidity. One will appreciate that other cross-sectional geometries may be used in accordance with the present invention. The flat portions 11a of the main back beams 11 which are coupled in a surface contact fashion by arc welding.

Arc welding has an advantage in that it has a shorter welding time than spot welding which is typically used when the back beam assembly is manufactured, and can improve productivity.

Figure 8:
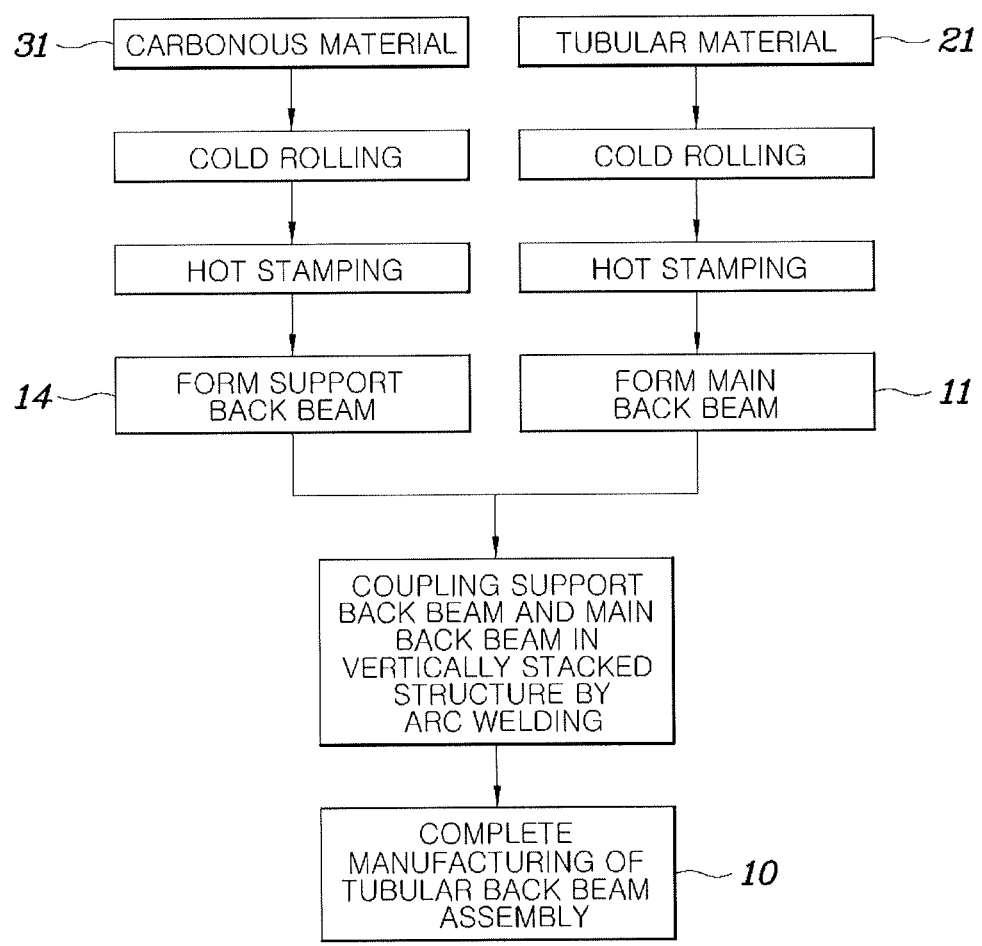

In a manufacturing method according to various other embodiments of the present invention, a main back beam 11 and a support back beam 14 are coupled to each other in a stacked way such as those shown in FIGS. 5, 6, and 8. The manufacturing method includes cold rolling and hot stamping a carbonous material 31 to form at least one support back beam 14 having a C-shaped cross section in which one side thereof is opened in a longitudinal direction, cold rolling and hot stamping a tubular carbonous material 21 to form a main back beam 11 having a quadrangular cross section, and coupling the support back beam 14 and the main back beam 11 in a vertically stacked structure. Thereby, the tubular back beam assembly 10 is manufactured.

Here, the carbonous material 31 used to form the support back beam 14 is preferably a material having a plate shape rather than the tubular shape. However, the shape is not limited to the plate shape.

When the tubular back beam assembly 10 is manufactured, one portion of the main back beam 11 is inserted into an opening of the support back beam 14, and then both ends of the support back beam 14 and an overlapping portion of the main back beam 11 are coupled such as by arc welding.

In addition, the tubular back beam assembly 10 may be manufactured so that the one support back beam 14 and the one main back beam are coupled in a stacked way as shown in FIG. 5, or the support back beams 14 are coupled on and under the main back beam 11 in a stacked way, as shown in FIG. 6.

As described above, the tubular back beam assembly 10 according to various embodiments of the present invention has a structure in which the plurality of main back beams 11 are coupled in a vertically stacked structure with the flat portions coupled in a surface contact fashion, or the main back beam 11 and the support back beam 14 are directly coupled in a vertically stacked way. Thereby, physical properties (coupling strength and bending rigidity based on the surface contact fashion of the coupling portions) of the tubular back beam assembly 10 are remarkably increased. As a result, there is an advantage in that sufficient collision strength can be secured, and the capability of protecting the vehicle and the passenger can be improved.

In addition, the tubular back beam assembly 10 according to the present invention is manufactured by cold rolling and hot stamping the material of the back beam. Thus, there is an advantage in that the tubular back beam assembly 10 can be reduced in weight, and be remarkably improved in coupling strength.

For convenience in explanation and accurate definition in the appended claims, the terms "upper" or "lower", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A tubular back beam assembly for a vehicle comprising:
    a main back beam formed in a tubular shape having substantially a quadrangular cross section;
    a support back beam formed to have a C-shaped cross section with an opening extended in a width direction of the vehicle;
    a pair of crash boxes whose front ends are coupled to rear surfaces of the main back beam and the support back beam at both ends of the main back beam and the support back beam and whose rear ends are coupled to members of a vehicle body, wherein vertical faces of the front ends of the crash boxes are coupled to the main back beam and the support back beam; and
    wherein one portion of the main back beam is inserted into the opening of the support back beam to close the opening of the support back beam and form a vertically stacked structure along with the support back beam.

2. The tubular back beam assembly of claim 1, further comprising:
    a towing hook, one end of which is detachably coupled to the main back beam to which the crash boxes are coupled.

3. The tubular back beam assembly of claim 1, wherein the main back beam and the support back beam are coupled so that only one of an upper portion or a lower portion of the main back beam is inserted into the opening of the support back beam.

4. The tubular back beam assembly of claim 1, wherein the tubular back beam assembly includes a pair of the support back beams, one disposed on the main back beam and one disposed under the main back beam, and
    the main back beam and the support back beams are coupled so that the upper and lower portions of the main back beam are inserted into openings of the support back beams respectively.

\* \* \* \* \*